United States Patent
Brown

(10) Patent No.: US 8,572,728 B2
(45) Date of Patent: Oct. 29, 2013

(54) INITIATION OF STORAGE DEVICE SCANS

(75) Inventor: Norman Brown, Tomball, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 490 days.

(21) Appl. No.: 12/796,284

(22) Filed: Jun. 8, 2010

(65) Prior Publication Data

US 2011/0302650 A1 Dec. 8, 2011

(51) Int. Cl.
*G06F 21/00* (2013.01)

(52) U.S. Cl.
USPC .................................. 726/21; 726/1

(58) Field of Classification Search
USPC .................................. 726/24, 1, 21
See application file for complete search history.

(56) References Cited

U.S. PATENT DOCUMENTS

| | | | |
|---|---|---|---|
| 7,073,021 B2 | 7/2006 | Iren et al. | |
| 7,085,934 B1 | 8/2006 | Edwards | |
| 7,159,218 B2 | 1/2007 | Abe et al. | |
| 2002/0166085 A1* | 11/2002 | Peikari | 714/38 |
| 2006/0037079 A1* | 2/2006 | Midgley | 726/24 |
| 2006/0143713 A1 | 6/2006 | Challener | |
| 2006/0190938 A1* | 8/2006 | Capek et al. | 717/161 |
| 2006/0236398 A1* | 10/2006 | Trakic et al. | 726/24 |
| 2007/0256075 A1 | 11/2007 | Denis | |
| 2007/0266436 A1 | 11/2007 | Ballard et al. | |
| 2008/0086734 A1* | 4/2008 | Jensen et al. | 718/104 |
| 2009/0063570 A1* | 3/2009 | Nichols et al. | 707/200 |
| 2009/0070879 A1* | 3/2009 | Saika | 726/24 |
| 2009/0089880 A1* | 4/2009 | Kobayashi et al. | 726/24 |

OTHER PUBLICATIONS

"Changing AntiVirus Schedule Settings." Delta State University. 2010.

* cited by examiner

*Primary Examiner* — Peter Shaw
*Assistant Examiner* — Ali Shayanfar

(57) ABSTRACT

Example embodiments relate to initiation of storage device scans based on a record of existing scans of the storage device. In particular, example embodiments include a mechanism that maintains a record of existing scans of the storage device including an entry for each scan initiated by one of a plurality of scanning processes. In some embodiments, the record of existing scans may then be accessed in determining whether to initiate or permit initiation of a new scan.

6 Claims, 6 Drawing Sheets

INITIATION OF STORAGE DEVICE SCANS

BACKGROUND

As user reliance on computing devices has increased, applications designed for preventive maintenance have increased in importance. A typical computing device now includes numerous maintenance applications that run on a regular basis, including virus and malware scanners, disk defragmenters, and registry cleaners. In addition to maintenance software, many computing devices include applications designed to increase usability of the device, such as file or email indexing applications and software update programs. Each of these programs may require constant or intermittent access to a storage device included in the computing device.

Paradoxically, as the number of applications designed to improve usability increases, the user's quality of experience may be negatively affected. In particular, when multiple scanning programs are simultaneously running on the computing device, the user may experience slowdowns or may even be unable to use the device until the applications have completed execution.

BRIEF DESCRIPTION OF THE DRAWINGS

In the accompanying drawings, like numerals refer to like components or blocks. The following detailed description references the drawings, wherein.

DETAILED DESCRIPTION

When a computing device is executing multiple applications that require frequent disk access, a user of the computing device may experience slowdowns or even be unable to use the computing device. To address this issue, example embodiments disclosed herein provide for initiation of storage device scans based on a record of existing scans of the storage device.

In particular, in some embodiments, a record of existing scans is maintained to include an entry for each scan initiated by one of a plurality of scanning processes. In some embodiments, the record of existing scans may then be accessed in determining whether to initiate or permit initiation of a new scan by a particular scanning process. In this manner, a number of scanning processes running on a computing device may coordinate their operation in a cooperative manner, thereby minimizing slowdowns due to simultaneous access to the storage device. Additional embodiments and applications of such embodiments will be apparent to those of skill in the art upon reading and understanding the following description.

In the description that follows, reference is made to the term, "machine-readable storage medium." As used herein, the term "machine-readable storage medium" refers to any electronic, magnetic, optical, or other physical storage device that contains or stores executable instructions or other data (e.g., a hard disk drive, flash memory, etc.).

Figure 1:
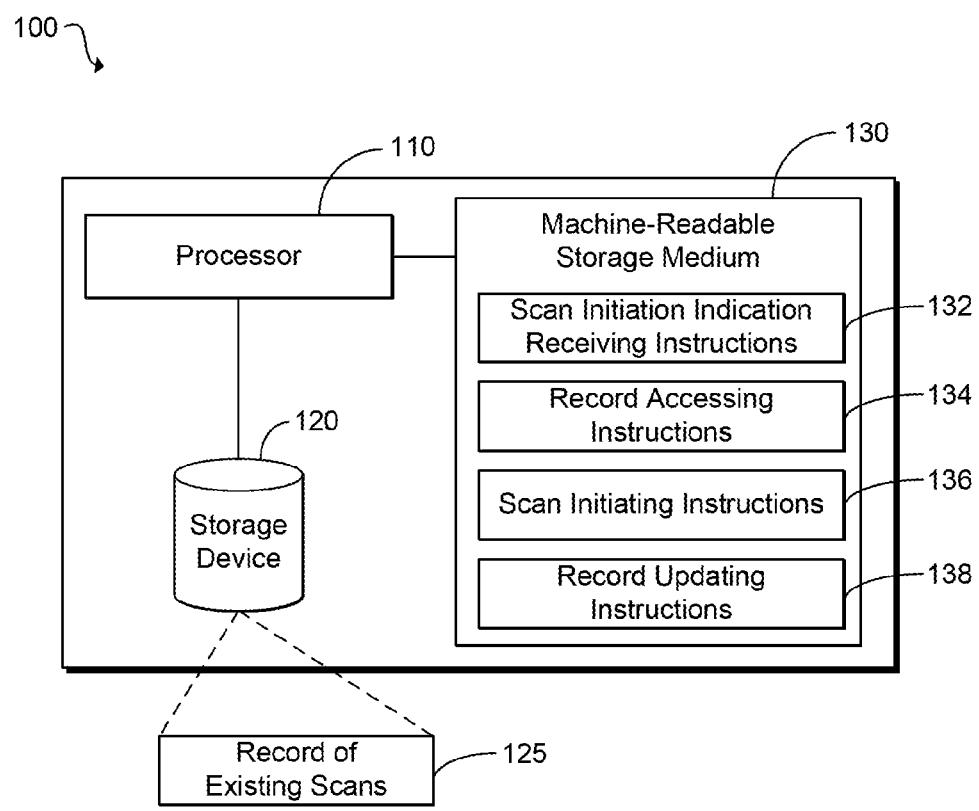
FIG. 1 is a block diagram of an example computing device including a record of existing scans of a storage device.

Referring now to the drawings, FIG. 1 is a block diagram of an example computing device 100 including a record of existing scans 125 of a storage device 120. Computing device 100 may be, for example, a desktop computer, a laptop computer, a touch screen computer, a handheld or slate computing device, a mobile phone, or the like. In the embodiment of FIG. 1, computing device 100 includes processor 110, storage device 120, and machine-readable storage medium 130.

Processor 110 may be a central processing unit (CPU), a semiconductor-based microprocessor, or any other hardware device suitable for retrieval and execution of instructions encoded in machine-readable storage medium 130. In particular, processor 110 may fetch, decode, and execute instructions 132, 134, 136, 138 to execute a scanning process that implements the scan management process described herein.

Storage device 120 may be, for example, a hard disk drive, a solid state drive, a nanodrive, a holographic storage device, or any other storage device that provides data storage capability to computing device 100. In some embodiments, storage device 120 is an internal component of computing device 100, while, in other embodiments, storage device 120 is an external component connected to computing device 100 with a cable or via a wireless connection. Regardless of the configuration, storage device 120 may be accessible to computing device 100 via an appropriate communications medium, such as a bus, cable, radio frequency field, etc.

During operation of computing device 100, a plurality of scanning processes may access storage device 120 to perform a number of scans. For example, a scanning process may perform a virus or malware scan, registry clean-up, file indexing procedure, or any other procedure that requires constant or intermittent access to storage device 120.

As illustrated, storage device 120 may maintain a record of existing scans 125 detailing scans initiated by the plurality of scanning processes. The record of existing scans 125 may include, inter alia, an entry for each in-progress initiated by one of the plurality of scanning processes. Each entry in record 125 may include, for example, an identifier for the particular scan instance, an identifier of the associated scanning process, and/or details about execution of the particular scanning process (e.g., whether it is in progress, when the scan started, an estimated duration, etc.). It should be noted that, although illustrated as included in storage device 120, record of existing scans 125 may be stored in any storage medium of computing device 100. As described in detail below, each of the scanning processes may access record of existing scans 125 to implement a cooperative process for limiting simultaneous access to storage device 120.

Machine-readable storage medium 130 may be an electronic, magnetic, optical, or other physical device that contains or stores executable instructions. In particular, processor 110 may execute instructions 132, 134, 136, 138 stored in machine-readable storage medium 130. Instructions 132, 134, 136, 138 may be included in each scanning process to implement the cooperative scan management process described in detail below.

Scan initiation indication receiving instructions 132 may receive an indication for the particular scanning process to initiate a new scan that accesses storage device 120. This indication may be provided, for example, by a user through interaction with a user interface of the scanning process (e.g., clicking a start button). As another example, this indication may be provided at a predetermined time by a scheduler executed by the scanning process, by the operating system, or by another scheduling application.

Upon receipt of the indication to begin a scan, the scanning process may execute a number of instructions to verify that the scan has permission to initiate a new scan. In particular, record accessing instructions 134 may access the record of existing scans 125 to determine whether to initiate the new scan.

Record accessing instructions 134 may use a number of techniques in determining whether to initiate a new scan. In some embodiments, record accessing instructions 134 may determine that the new scan may be initiated when the total number of in-progress scans is less than a maximum threshold. For example, exclusive access to storage device 120 may be provided to a single in-progress scan using a threshold of one. In this manner, the record of existing scans 125 would act as a semaphore that may only be assigned to a single process at a time. This number may be increased by the scanning processes or by the user depending on a desired performance level. In other embodiments, record accessing instructions 134 may determine whether to initiate the scan based on storage device accesses. For example, record accessing instructions 134 may only allow initiation of a new scan when a rate of storage device accesses (e.g., reads per second) is below a threshold. Other suitable methods for determining whether to initiate a new scan based on record of existing scans 125 will be apparent to those of skill in the art.

Scan initiating instructions 136 may initiate the scan by the scanning process when record accessing instructions 134 determine that the scan may be initiated. In particular, scan initiating instructions 136 may begin accessing storage device 120 to execute the particular scan (e.g., a virus or malware scan, registry clean-up, disk defragmentation, file indexing, etc.). Alternatively, when it is determined that the scan may not be initiated due to the presence of other in-progress scans, the scanning process may halt execution until, for example, receipt of a next initiation indication or expiration of a predetermined time period.

In addition, when the scan is initiated, record updating instructions 138 may update record of existing scans 125 to include an entry for the current scan. In updating record 125, the scanning process may provide details for inclusion in the entry including, for example, an identifier of the scanning process and any details about execution of the process, such as a start time, an estimated duration, and the like.

Figure 2:
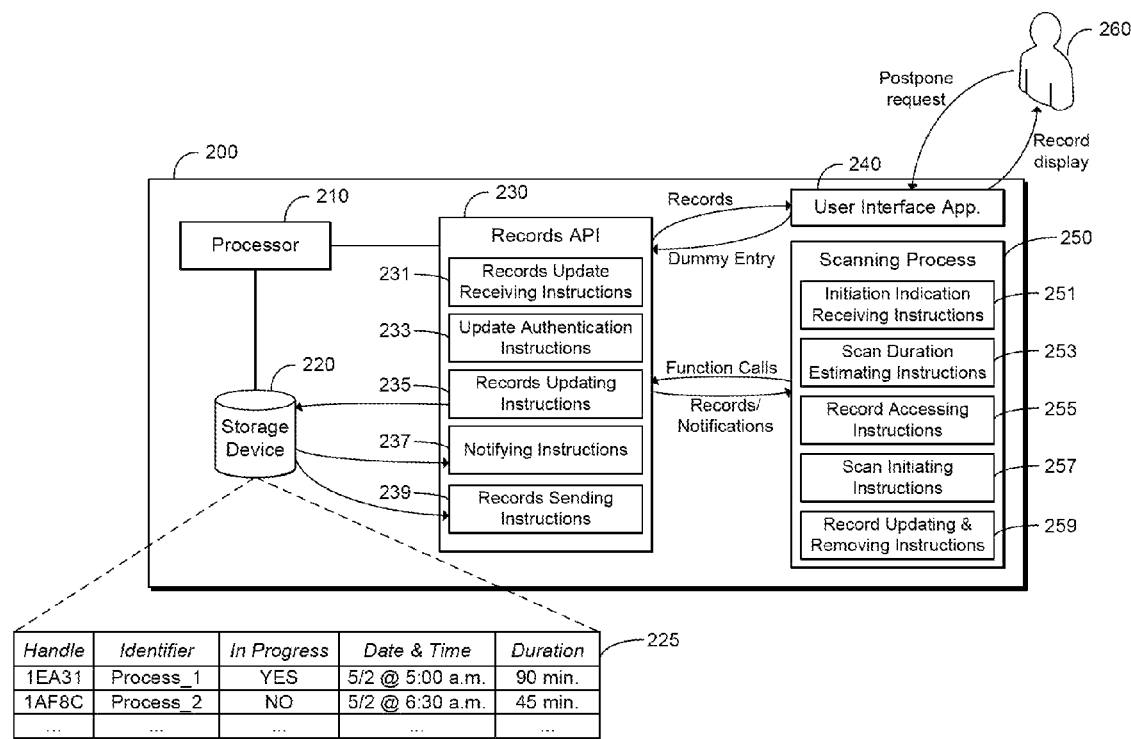
FIG. 2 is a block diagram of an example computing device including a record of existing scans managed by a records Application Programming Interface (API) in communication with a scanning process and a user.

FIG. 2 is a block diagram of an example computing device 200 including a record of existing scans 225 of a storage device 220 managed by a records Application Programming Interface (API) 230 in communication with a scanning process 250 and a user 260. Computing device 200 may be, for example, a desktop computer, a laptop computer, a touch screen computer, a handheld or slate computing device, a mobile phone, or the like. In the embodiment of FIG. 2, computing device 200 includes processor 210, storage device 220, records API 230, user interface application 240, and a number of scanning processes 250.

As with processor 110 of FIG. 1, processor 210 may be a central processing unit (CPU), a semiconductor-based microprocessor, or any other hardware device suitable for retrieval and execution of records API 230, user interface application 240, and scanning process 250. As with storage device 120, storage device 220 may be an internal or external hard disk drive, solid state drive, nanodrive, holographic storage device, or other storage device that provides data storage capability to computing device 200.

In the embodiment of FIG. 2, storage device 220 maintains a record of existing scans 225 of storage device 220 initiated by a plurality of scanning processes, such as scanning process 250. As illustrated, record of existing scans 225 may include a number of fields, such as a scan handle, which may be a unique identifier for a particular instance of a given scanning process, which, as described in detail below, may be generated by records API 230 when updating record of existing scans 225. This handle may be, for example, a globally unique identifier (GUID), a random set of characters or numbers (e.g., a random dword), or any other identifier sufficient to uniquely identify each scan instance. In addition, record of existing scans 225 may include a scanning process identifier, an in-progress value indicating whether the particular scan is running (e.g., yes or no), a scan start date and time, and a estimated scan duration.

Records API 230 may include a series of instructions encoded on a machine-readable storage medium of computing device 200. In some embodiments, records API 230 may serve as an intermediary between each scanning process 250 and record of existing scans 225. As described below, one or more of instructions 231, 233, 235, 237, 239 may be presented to user interface application and each scanning process as an API function. In this manner, API 230 may receive function calls from user interface application 240 and each scanning process 250 and, in response, modify, retrieve, or otherwise access record of existing scans 225. It should be noted that, in other embodiments, the user interface application 240 and scanning processes 250 may directly access and manage record of existing scans 225 without the use of records API 230 as an intermediary.

Records update receiving instructions 231 may receive an update message from a particular scanning process 250 indicating that the scanning process 250 is initiating a new scan. As described above, this update message may be a function call to records API 230, which may direct API 230 to create a new record in record of existing scans 225. The update message may include, for example, an identification of the scanning process, a desired start time and date (which may be the current time), and/or an estimated scan duration.

Update authentication instructions 233 may perform an authentication process upon receipt of an API function call from a scanning process 250 to ensure that the process is authorized to access and modify the record of existing scans 225. In some embodiments, authentication of scanning process 250 may be certificate-based. In particular, each scanning process 250 may obtain a certificate from a certificate authority executing in computing device 200. When making a function call, the scanning process 250 may provide the certificate to authentication instructions 233 and, in response, API 230 may authenticate the certificate with the certificate authority using a root certificate to verify the identity of the scanning process. As an alternative, an OEM or other party may provide a key to each authorized vendor or developer, such that scanning process 250 may provide the key to API 230, which, in turn, may verify the key. Other suitable authentication schemes will be apparent to those of skill in the art.

Upon proper authentication of scanning process 250, records updating instructions 235 may update the record of existing scans 225 with a new entry containing information regarding the new scan initiated by the respective process. In particular, records updating instructions 235 may access record of existing scans 225 and create a new record containing the scan details included with the records update message provided by scanning process 250 to receiving instructions 231. In addition, in some embodiments, records updating instructions 235 may generate a handle for the particular scan instance, which as described above, may be a GUID, a random numeral or string, and the like.

Notifying instructions 237 may analyze record of existing scans 225 to determine whether scanning process 250 may initiate the new scan and, in response, notify scanning process 250 of the decision. In particular, notifying instructions 237 may first analyze record of existing scans 225 to identify all in-progress scans. In response, notifying instructions 237 may determine whether the total number of in-progress scans is less than a predetermined threshold and, if so, may determine that the scan may be initiated and notify scanning process 250 accordingly. Alternatively, notifying instructions 237 may use another value to determine whether to permit initiation of the scan, such as a number of accesses to storage device 220 in a predetermined period of time (e.g., accesses per second).

When analysis of record of existing scans 225 results in a determination that the new scan may not be initiated, notifying instructions 237 may notify scanning process 250 that the scan cannot be started immediately. In some embodiments, notifying instructions 237 may include an estimated time at which scanning capacity will be available, such that scanning process 250 may again attempt to initiate the scan at the estimated time. As an alternative, notifying instructions 237 may simply notify scanning process 250 that it should not begin the scan and queue a notification to scanning process 250 when one or more existing scanning processes finish. In this manner, notifying instructions 237 may notify scanning process 250 as soon as scanning capacity becomes available.

Regardless of the particular response sent to scanning process 250, notifying instructions 237 may include the generated handle for the particular scan. In this manner, scanning process 250 may subsequently utilize the generated handle when accessing, modifying, or removing the entry for the particular scan in record of existing scans 225.

In some embodiments, notifying instructions 237 may implement a notification procedure upon resuming from an improper shutdown of computing device 200. API 230 may include, for example, a tag that is set to false after initialization and that is modified to true upon a proper shutdown of computing device 200. Upon initialization, API 230 may first access this tag and, when the tag is still false, may determine that computing device 200 did not shutdown properly. In response, API 230 may identify all scans that were in progress prior to the improper shutdown and transmit a notification to each scanning process 250 instructing the process that it may resume the scan.

As an alternative to managing simultaneous access to storage device 220 by a predetermined number of applications (or up to a predefined access threshold), notifying instructions 237 may operate in a round-robin fashion. In particular, notifying instructions 237 may cycle through each scanning process 250 that is currently in progress, allowing each scanning process 250 a predetermined amount of time with exclusive access to storage device 220. In this manner, each scanning process 250 may be provided with a chunk of time in which it may access storage device 220.

As described above with respect to notifying instructions 237, API 230 may handle the process of determining whether to permit a scan and notifies the particular scanning process 250 accordingly. As an alternative, in some embodiments, each scanning process 250 may include logic for determining whether to initiate a scan. In such embodiments, each scanning process 250 may access record of existing scans 225 using API 230 and determine whether to initiate a new scan based on the information returned by API 230.

Records sending instructions 239 may be configured to retrieve and return one or more entries in record of existing scans 225 based on receipt of a request from a particular scanning process 250. Along with this request, scanning process 250 may include a handle of a particular scan and, in response, sending instructions 239 may retrieve and return the record for the particular scan.

User interface application 240 may include a series of instructions encoded on a machine-readable storage medium of computing device 200. In particular, user interface application 240 may include instructions that allow user 260 of computing device 200 to access record of existing scans 225. For example, user 260 may provide a record retrieval instruction to user interface application 240, which, in turn, may interact with records API 230 to retrieve and display the requested records.

In some embodiments, user interface application 240 may implement a scan override feature to allow user 260 to stop all scans running by the plurality of scanning processes 250. In particular, user 260 may provide a request to user interface application 240 requesting that all scans of storage device 220 be postponed. In some embodiments, the request from user 260 may identify a predetermined period of time for which the scans are to be postponed. In response, user interface application 240 may submit a request to API 230 to create a dummy entry in the record of existing scans 225 that supersedes all scans currently in progress. User interface application 240 may accomplish this by, for example, specifying that the dummy scan has a "Very High" priority and that it requires exclusive access to storage device 220. In response to receipt of such a message, API 230 may notify all processes that are currently running a scan that the scan should be halted. In embodiments in which the user specifies a period of time, application 240 may include this time as the estimated scan duration. In this manner, user 260 may easily disable all scans of storage device 220 when required (e.g., when giving a presentation, performing storage-intensive operations, etc.).

Scanning process 250 may also include a series of instructions encoded on a machine-readable storage medium of computing device 200. Although illustrated as a single scanning process 250, multiple processes including instructions 251, 253, 255, 257, 259 may execute simultaneously in computing device 200. For example, computing device 200 may include a virus scanner, a malware scanner, a file indexing service, a registry cleaner, and the like.

Scan initiation indication receiving instructions 251 may be configured similarly to instructions 132 of FIG. 1. In particular, receiving instructions 251 may receive an indication for the particular scanning process to initiate a new scan that accesses storage device 120. This indication may be, for example, a user command, an instruction from a scheduling program, or any other indication to begin a scan.

In response to receipt of the scan initiation indication, scan duration estimating instructions 253 may determine an estimated duration of the scan to be initiated. In making this determination, estimating instructions 253 may consider, for example, the duration of each of a number of scans previously completed by scanning process 250. As an alternative, estimating instructions 253 may perform a small portion of the total scan (e.g., 1 percent) and determine an estimate for the entire procedure based on the total elapsed time for the scan of the portion. As yet another alternative, estimating instructions 253 may determine an estimate using performance characteristics of storage device 220 based on a projected number of accesses and an amount of data to be read from and/or written to storage device 220. Other suitable methods for estimating the duration of a new scan will be apparent to those of skill in the art.

Record accessing instructions 255 may be configured similarly to record accessing instructions 134 of FIG. 1. In particular, instructions 255 may utilize a number of methods to determine whether to initiate a new scan. For example, record accessing instructions 255 may make this determination based on a total number of scans in progress, a current level of access to storage device 220, and other similar factors.

As an alternative to the methods described above in connection with FIG. 1, in the embodiment of FIG. 2, record accessing instructions 255 may instead rely on a notification from records API 230. In particular, as described in detail above, notifying instructions 237 of API 230 may determine whether to permit scanning process 250 to initiate a new scan and, in response, send an appropriate notification to scanning process 250.

Scan initiating instructions 257 may initiate the scan of scanning process 250 when record accessing instructions 255 determine that the scan may be initiated or when scanning process 250 receives a positive notification from records API 230. In particular, scan initiating instructions 257 may begin accessing storage device 220 to execute the particular scan.

Alternatively, when scan initiating instructions 257 determine that scanning process 250 is not authorized to begin a new scan, instructions 257 may postpone initiation of the new scan until a later time. For example, when record accessing instructions 255 obtained the estimated time of completion from records 225 (or information usable to derive that time), scan initiating instructions 257 may again attempt to initiate the scan at the earliest estimated time of completion among the existing scans. Alternatively, notifying instructions 237 of records API 230 may explicitly notify initiating instructions 257 at the time when the scan may be initiated.

When a scan is initiated, record updating and removing instructions 259 may update record of existing scans 225 to include an entry for the newly-initiated scan of scanning process 250 using a function call to API 230. Updating instructions 259 may include, for example, the handle of the particular scan instance, an identifier of the scanning process, an in-progress field set to true, a start time and date, and the estimated duration determined by estimating instructions 253. In addition, upon completion of the scan, instructions 259 may remove the record for the scan from record of existing scans 225 using a function call to API 230.

Figure 3:
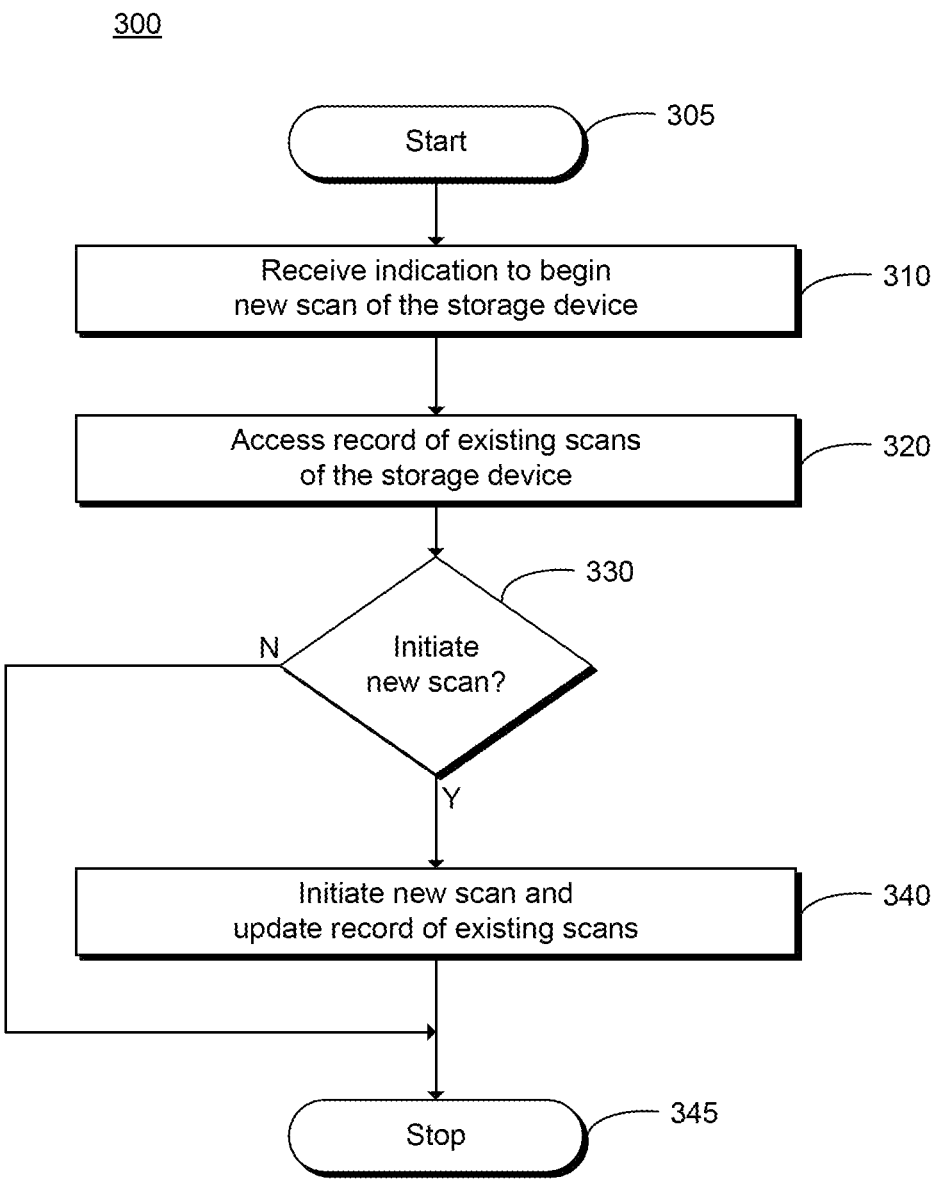
FIG. 3 is a flowchart of an example method performed by a scanning process when initiating a new scan of a storage device.

FIG. 3 is a flowchart of an example method 300 performed by a scanning process when initiating a new scan of a storage device 120. Although execution of method 300 is described below with reference to computing device 100 and a scanning process running therein, other suitable components for execution of method 300 will be apparent to those of skill in the art. Method 300 may be implemented in the form of executable instructions stored on a machine-readable storage medium.

Method 300 may start in block 305 and proceed to block 310, where computing device 100 may receive an indication to begin a new scan of storage device 120. For example, a user may manually trigger a new scan or, alternatively, a scheduler executed by the scanning process, operating system, or another application may trigger automatic execution of the scan.

Method 300 may then proceed to block 320, where the scanning process executing in computing device 100 may access a record of existing scans 125 of storage device 120. As an example, the scanning process may access the record of existing scans 125 directly or, alternatively, may access record 125 using an API, such as API 230 of FIG. 2.

After accessing the record of existing scans, method 300 may proceed to block 330, where the scanning process may determine whether to initiate a new scan. As described in detail above in connection with record accessing instructions 134 of FIG. 1, the scanning process may utilize a number of techniques in determining whether to initiate a new scan. In some embodiments, the scanning process may determine that the new scan may be initiated when the total number of in-progress scans is less than a maximum threshold. In other embodiments, the scanning process may determine whether to initiate the scan based on storage device accesses (e.g., a current number of reads per second). Other suitable methods for determining whether to initiate a new scan based on record of existing scans 125 will be apparent to those of skill in the art.

When it is determined in block 330 that the scanning process may initiate a new scan, method 300 may proceed to block 340, where the scanning process may start the scan and update the record of existing scans 125 with information regarding the scan. Method 300 may then proceed to block 345, where method 300 may stop. Alternatively, when it is determined in block 330 that the scanning process should not initiate a new scan, method 300 may skip directly to block 345.

Figure 4A:
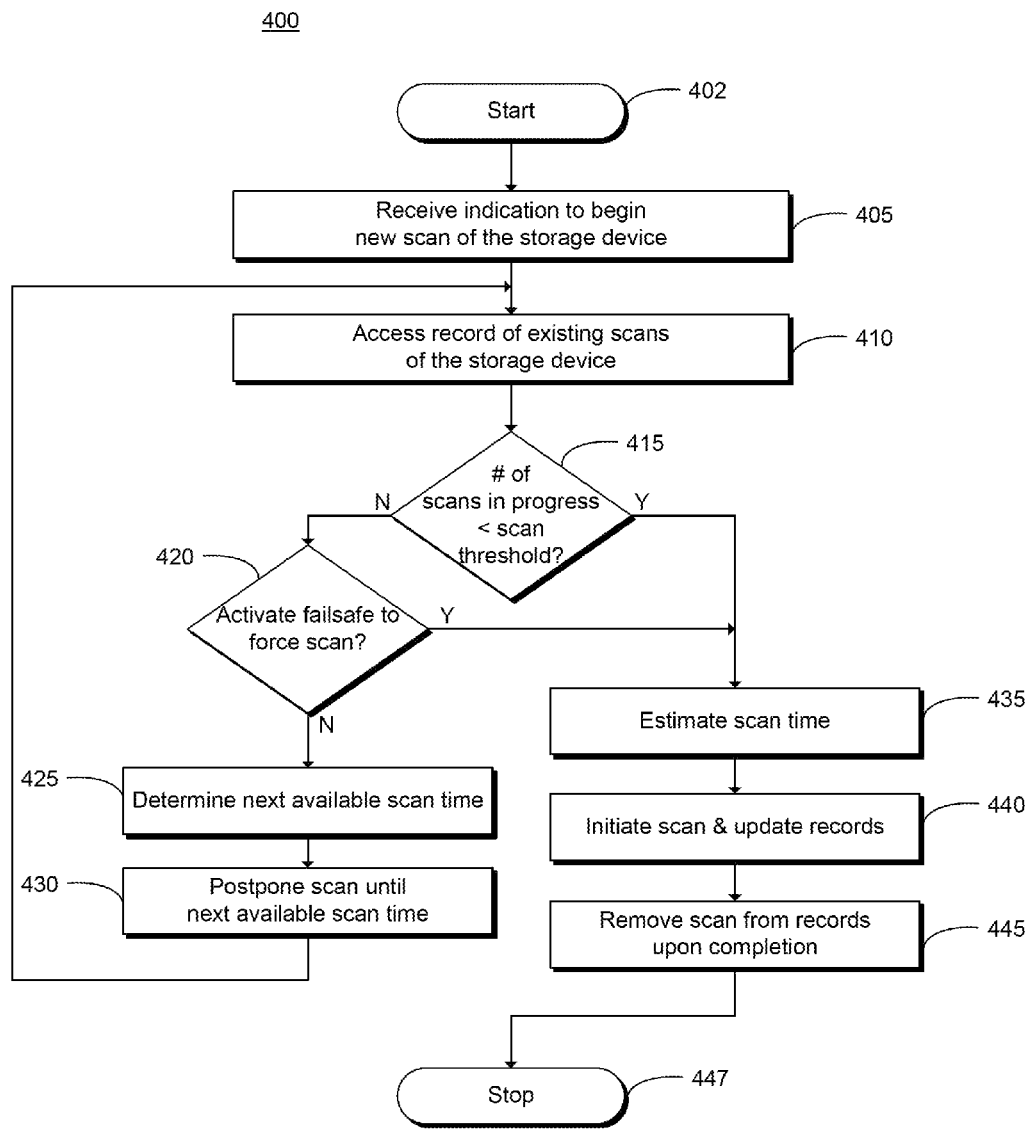
FIG. 4A is a flowchart of an example method performed by a scanning process to determine whether to initiate a new scan based on a number of scans currently in progress.

FIG. 4A is a flowchart of an example method 400 performed by a scanning process to determine whether to initiate a new scan based on a number of scans currently in progress. Although execution of method 400 is described below with reference to computing device 200 and a scanning process 250 running therein, other suitable components for execution of method 400 will be apparent to those of skill in the art. Method 400 may be implemented in the form of executable instructions stored on a machine-readable storage medium.

Method 400 may start in block 402 and proceed to block 405, where a scanning process 250 executing in computing device 200 may receive an indication to begin a new scan of storage device 220. For example, a user may manually trigger a new scan or, alternatively, a scheduler executed by the scanning process 250, operating system, or another application may trigger automatic execution of the scan.

Method 400 may then proceed to block 410, where the scanning process 250 executing in computing device 200 may access a record of existing scans 225 of storage device 220. As an example, the scanning process may access the record of existing scans 225 directly or, alternatively, may access record 225 using API 230 as an intermediary.

Method 400 may then proceed to block 415, where scanning process 250 may determine whether to initiate a new scan. In particular, in the illustrated embodiment of block 415, scanning process 250 may determine whether the number of scans currently in progress is less than a threshold. For example, in embodiments in which scanning processes 250 are to have a minimal effect on computing device 200, the threshold may be set to one. In this manner, the threshold would operate as a semaphore. Alternatively, the threshold may be increased to two or more depending on the desired balance between the number of scans to be permitted and performance of computing device 200.

When it is determined in block 415 that the number of scans in progress is not less than the scan threshold (i.e., is greater than or equal to), method 400 may proceed to block 420, where scanning process 250 may determine whether to activate a failsafe. For example, a user may configure a setting in scanning process 250 to ensure that the scan occurs at least once in a predetermined period of time. When this period of time has elapsed, scanning process 250 may force initiation of a scan by creating a scan record with an "urgent" status.

Similarly, scanning process 250 may determine that the new scan is urgent based on one or more factors, such as the likelihood of a serious problem (e.g., a harmful virus is likely present) or the performance of computing device (e.g., storage device 220 is more than 10% fragmented).

If scanning process 250 determines that it should activate the failsafe, method 400 may proceed to block 435, described in detail below. Alternatively, method 400 may proceed to block 425, where scanning process 250 may determine the next available scan time. For example, scanning process 250 may analyze the record of existing scans 225 to determine the earliest estimated time of completion of the scans currently in progress. Method 400 may then proceed to block 430, where scanning process 250 may postpone the new scan until the next available scan time determined in block 425. Subsequently, at the next available scan time, method 400 may return to block 410, where scanning process 250 may again attempt to initiate the new scan.

Referring again to block 415, when it is determined that the number of scans in progress is less than the predetermined threshold, method 400 may proceed to block 435. In block 435, scanning process 435 may estimate the scan duration using, for example, records of past scans, a test of a small percentage of the total scan, or another similar method.

After determining the estimated scan duration, method 400 may proceed to block 440, where scanning process 250 may initiate the scan and update record of existing scans 225. In updating the record 225, scanning process 250 may include, for example, a scan handle, a scanning process identifier, an in-progress value of true, the current date and time, and/or the estimated duration determined in block 435. In addition, when scanning process 250 is initiating the scan in response to activation of a failsafe scan in block 420, process 250 may also provide a value indicating that the scan is urgent.

Upon completion of the scan, method 400 may proceed to block 445. In block 445, scanning process 250 may remove the scan entry from record of existing scans 225. Method 400 may then proceed to block 447, where method 400 may stop.

Figure 4B:
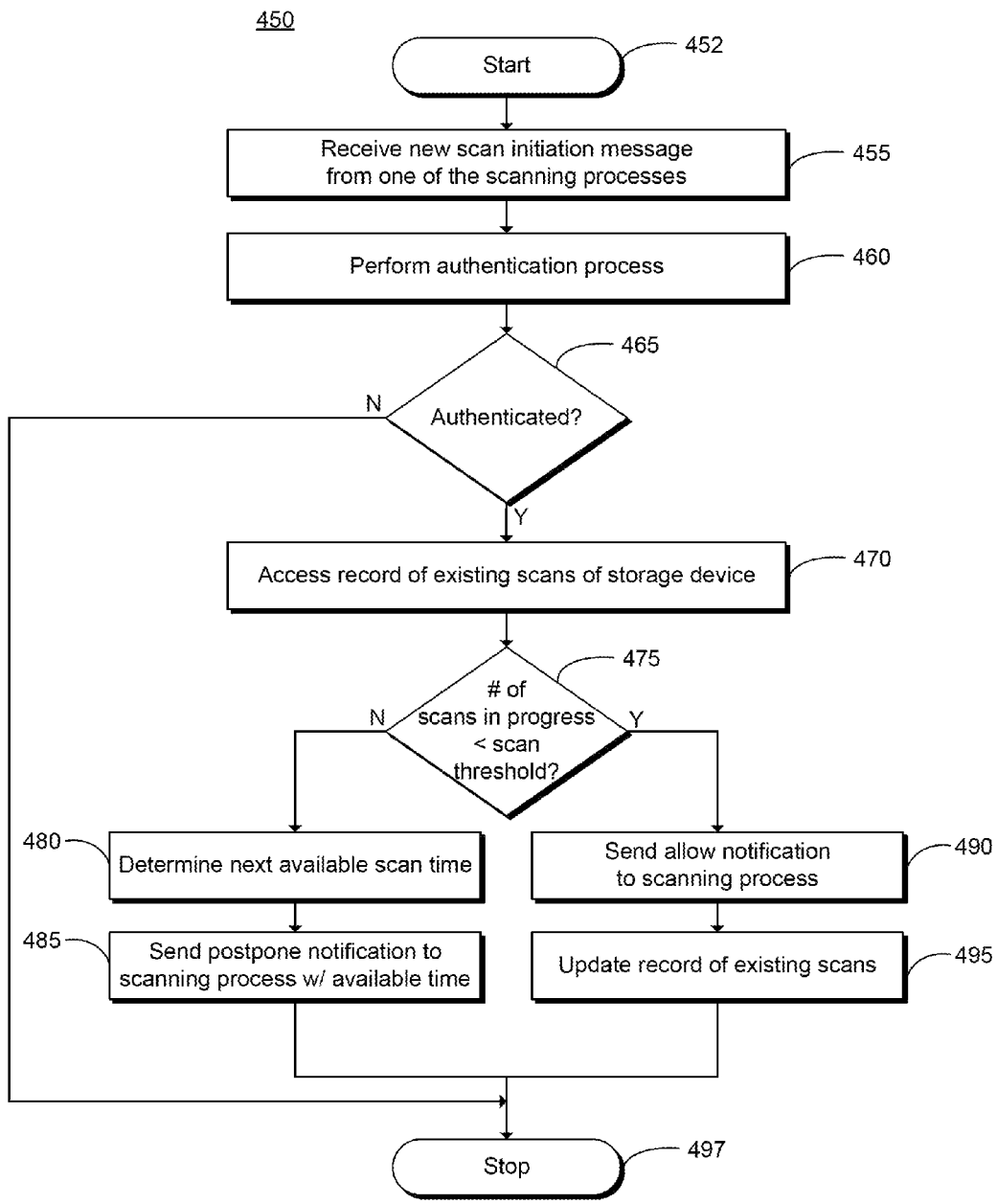
FIG. 4B is a flowchart of an example method performed by a records API to manage initiation of a new scan of a storage device by a scanning process.

FIG. 4B is a flowchart of an example method 450 performed by a records API 230 to manage initiation of a new scan of a storage device 220 by a scanning process 250. Although execution of method 400 is described below with reference to computing device 200 and a records API 230 running therein, other suitable components for execution of method 450 will be apparent to those of skill in the art. Method 450 may be implemented in the form of executable instructions stored on a machine-readable storage medium.

Method 450 may start in block 452 and proceed to block 455, where records API 230 executing in computing device 200 may receive a new scan initiation message from a particular scanning process 250. This message may be received in, for example, an API function call executed by the scanning process 250 that includes details about the scan (e.g., an identifier, an estimated duration, etc.).

Method 450 may then proceed to block 460, where records API 230 may perform an authentication procedure to ensure that the particular scanning process 250 has permission to access and modify record of existing scans 225. As described in detail above in connection with authentication instructions 233 of FIG. 2, this authentication process may be based on a certificate, key, or other authenticating information provided to API 230 by scanning process 250.

After performing the authentication process, method 400 may proceed to block 465, where records API 230 may determine whether the scanning process 250 is properly authenticated. If scanning process 250 is not properly authenticated, API 230 may determine that process 250 does not have permission to access the record of scans 225 and method 450 may therefore proceed to block 497, where method 450 may stop.

Alternatively, when scanning process 250 is properly authenticated, method 450 may proceed to block 470, where records API 230 may access the record of existing scans 250 to obtain details about any in-progress scans. Method 450 may then proceed to block 475, where records API 230 may determine whether to permit initiation of the scan. In the illustrated embodiment of block 475, records API 230 may determine whether to permit initiation based on the number of scans in progress as compared to a threshold.

When the total number of scans in progress is not less than a scan threshold (i.e., is greater than or equal to), method 450 may proceed to block 480. In block 480, records API 230 may determine the next available scan time by, for example, analyzing record of existing scans 225 to determine the earliest estimated time of completion. Method 450 may then proceed to block 485, where records API 230 may send a postpone notification to scanning process 250 and, in some embodiments, may include the next available scan time determined in block 480. Method 450 may then proceed to block 497, where method 450 may stop.

Referring again to block 475, when the total number of scans in progress is less than a scan threshold, method 450 may proceed to block 490. In block 490, records API 230 may send a notification to scanning process 250 indicating that the new scan may be initiated. In some embodiments, API 230 may generate a unique handle for the particular scan and return this handle to scanning process 250 along with the notification. Method 450 may then proceed to block 495, where records API 230 may update the record of existing scans 225 with details regarding the new scan to be initiated by scanning process 250 including, for example, the generated handle, an identifier of process 250, a start date and time, and an estimated scan duration. Method 450 may then proceed to block 497, where method 450 may stop.

Figure 5:
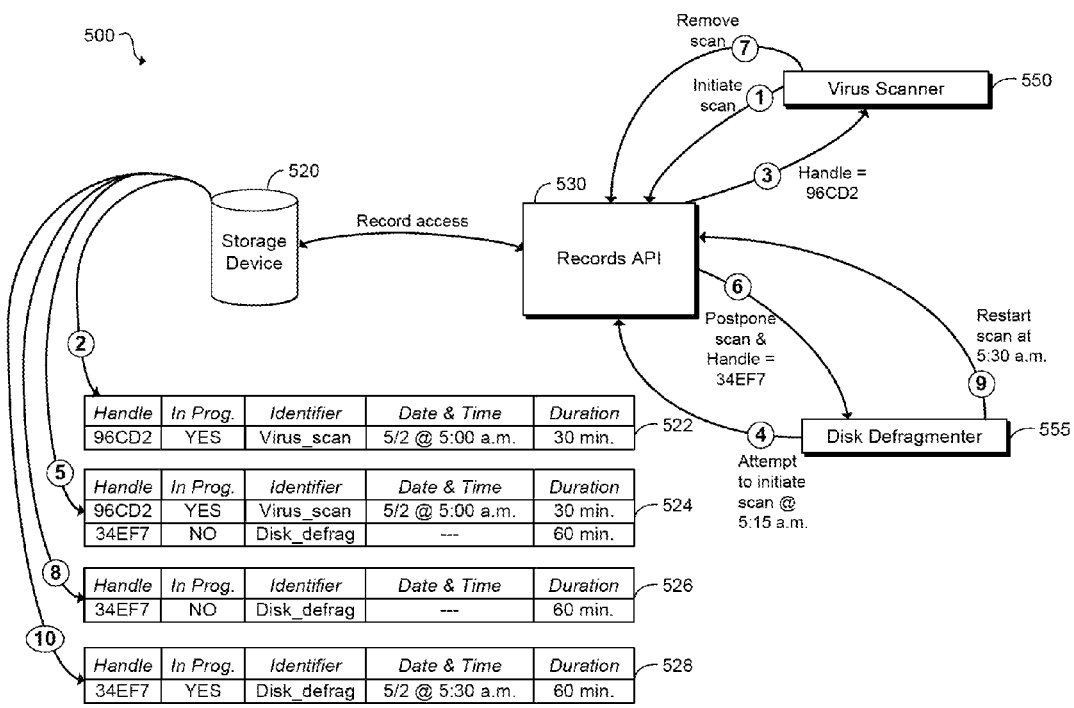
FIG. 5 is an example operation flow of a storage device scan management process performed by a records API in communication with two scanning processes.

FIG. 5 is an example operation flow 500 of a storage device scan management process performed by a records API 530 in communication with two scanning processes 550, 555. Storage device 520, records API 530, and scanning processes 550, 555 may all be included in a computing device, such as computing device 200 of FIG. 2, described in detail above. In the operation flow 500 described below, records API 530 implements a semaphore-based scan authorization process, such that only one scan of storage device 520 may be running at a given time. As described in detail above, however, numerous other methods may be used in determining whether to authorize initiation of a new scan.

Although described in detail below as including records API 530, in some embodiments, scanning processes 550, 555 may directly access the record of existing scans. In this manner, the scanning processes 550, 555 may access and modify the record of existing scans without using API 530 as an intermediary. In such embodiments, in the description that follows, any API function calls would be replaced by a direct access to the record of existing scans. Furthermore, in such embodiments, the logic for determining whether to initiate a scan would be implemented by the processes 550, 555, rather than records API 530.

Referring now to operation flow 500, in block 1, virus scanner 550 may attempt to initiate a new scan at 5:00 a.m. Accordingly, virus scanner 550 may send a scan initiation message to records API 530 as an API function call. In some embodiments, virus scanner may include an estimated scan duration, which may be determined as described above in connection with scan duration estimating instructions 253 of FIG. 2.

In block 2, records API 530 may receive the function call and, in response, access the record of existing scans maintained in storage device 520. In particular, records API 530 may first access the record to determine whether virus scanner 550 is authorized to initiate the scan. Because no scans are currently in progress, records API 530 may update record of existing scans to state 522, which includes a new record containing a generated handle (96CD2), an in progress value set to "YES", the identifier of virus scanner 550 (Virus_scan), the start date and time (May 2 @ 5:00 a.m.), and the estimated duration provided by virus scanner 550 (30 minutes). In block 3, records API 530 may notify virus scanner 550 that it may begin the new virus scan and, in addition, may provide the generated handle to virus scanner 550 for use in future accesses. In response, virus scanner 550 may begin the scan.

In block 4, a second scanning process, disk defragmenter 555, may attempt to initiate a scan at 5:15 a.m. Accordingly, disk defragmenter 555 may send a scan initiation message to records API 530 as an API function call. This message may include an estimated duration of the scan, 60 minutes. In response, records API 530 may access the record of existing scans of storage device 520 and determine that virus scanner 550 is executing an in-progress scan. Accordingly, in block 5, records API 530 may update the record of existing scans to state 524, which includes a new record containing a generated handle (34EF7), an in progress value set to "NO", the identifier of disk defragmenter 555 ("Disk_defrag"), and an estimated duration provided by disk defragmenter 555 (60 minutes). In response, in block 6, records API 530 may return a postpone message to disk defragmenter 555 notifying the process that it may again attempt to initiate a scan at 5:30 a.m. (the time at which the virus scan is estimated to be finished). This postpone message may also include the generated handle for the particular defragmentation procedure, 34EF7.

In block 7, virus scanner 550 may determine that the virus scan has completed and therefore generate a function call to records API 530 to remove the scan record from the record of existing scans. Accordingly, in block 8, records API 530 may update the record of existing scans to state 526, in which the record created for virus scanner 550 is removed.

In block 9, disk defragmenter 555 may determine that it is now 5:30 a.m. and therefore transmit another scan initiation message to records API 530. In response, records API 530 may determine that no scans are currently in progress. Accordingly, in block 10, records API 530 may update the record of existing scans to state 528, which indicates that disk defragmenter 555 initiated an in-progress scan at 5:30 a.m. In addition, records API 530 may notify disk defragmenter 555 that it may initiate the new scan and, in response, disk defragmenter 555 may begin its defragmentation procedure.

According to the foregoing, example embodiments disclosed herein provide for initiation of storage device scans based on a record of existing scans in the storage device. In some embodiments, the record of existing scans may be accessed in determining whether to initiate or permit initiation of a new scan by a particular scanning process. In this manner, a number of scanning processes running on a computing device may coordinate their operation in a cooperative manner, thereby minimizing slowdowns due to simultaneous access to the storage device.

I claim:

1. A non-transitory computer-readable storage medium encoded with instructions executable by a processor of a computing device, the storage medium comprising:

instructions for receiving an indication to initiate a new scan of a storage device accessible to the computing device;

instructions for accessing a record of existing scans of the storage device to determine whether to initiate the new scan, the record of existing scans including an entry for each in-progress scan of the storage device and comprising, for each existing scan, an identifier of the scan, an identifier of the process that initiated the scan, an indicator specifying whether the scan is currently in progress, a date and time at which the scan initiated or will be initiated, and an estimated duration for completing the scan;

instructions for initiating the new scan when the record of existing scans indicates that a total number of in-progress scans of the storage device is less than a predetermined threshold, and updating the record of existing scans to include an entry for the new scan when the new scan is initiated; and instructions for at least one of notifying a respective process of a particular time at which the respective process may attempt to initiate the new scan and notifying the respective process at a later time when the new scan can be started based on completion of one or more existing scans by other scanning processes, wherein:

the record of existing scans identifies an estimated time of completion of each in-progress scan, and the instructions for initiating the new scan begin the new scan at an earliest estimated time of completion.

2. A non-transitory computer-readable storage medium encoded with instructions executable by a processor of a computing device, the storage medium comprising:

instructions for receiving an indication to initiate a new scan of a storage device accessible to the computing device;

instructions for accessing a record of existing scans of the storage device to determine whether to initiate the new scan, the record of existing scans including an entry for each in-progress scan of the storage device and comprising, for each existing scan, an identifier of the scan, an identifier of the process that initiated the scan, an indicator specifying whether the scan is currently in progress, a date and time at which the scan initiated or will be initiated, and an estimated duration for completing the scan;

instructions for initiating the new scan when the record of existing scans indicates that a total number of in-progress scans of the storage device is less than a predetermined threshold, and updating the record of existing scans to include an entry for the new scan when the new scan is initiated;

instructions for at least one of notifying a respective process of a particular time at which the respective process may attempt to initiate the new scan and notifying the respective process at a later time when the new scan can be started based on completion of one or more existing scans by other scanning processes; and instructions for estimating a scan duration of the new scan, wherein the instructions for updating the record of existing scans include the estimated scan duration in the entry for the new scan.

3. A computing device comprising:

a processor;

a storage device;

a record of existing scans of the storage device initiated by a plurality of scanning processes, the record of existing scans identifying all scans of the storage device currently in progress and comprising, for each existing scan, an identifier of the scan, an identifier of the process that initiated the scan, an indicator specifying whether the scan is currently in progress, a date and time at which the scan initiated or will be initiated, and an estimated duration for completing the scan; and a non-transitory computer-readable storage medium encoded with instructions executable by the processor, the medium comprising:

instructions for receiving a message from a respective process of the plurality of scanning processes, the message indicating that the respective process is to initiate a new scan, instructions for accessing the record of existing scans and initiating the new scan by the respective process when the record of existing scans indicates that a total number of scans of the storage device currently in progress is below a predetermined threshold, instructions for updating the record of existing scans with a new entry containing information regarding the new scan to be initiated by the respective process, instructions for notifying the respective process when analysis of the record of existing scans indicates that the new scan cannot be started immediately, and instructions for at least one of notifying the respective process of a particular time at which the respective process may attempt to initiate the new scan and notifying the respective process at a later time when the new scan can be started based on completion of one or more existing scans by other scanning processes.

4. The computing device of claim 3, wherein:
the predetermined threshold is set by a user of the computing device.

5. The computing device of claim 3, wherein:
the instructions present an Application Program Interface (API) to the plurality of scanning processes, and
the instructions for receiving the message obtain the message as an API function call from the respective process.

6. The computing device of claim 5, wherein:
the API performs an authentication process upon receipt of the API function call prior to updating the record of existing scans, the authentication process determining whether the respective process is authorized to access and modify the record of existing scans.

* * * * *